United States Patent
Park

(10) Patent No.: US 9,577,460 B2
(45) Date of Patent: Feb. 21, 2017

(54) WIRELESS CHARGING DEVICE AND CONTROL METHOD THEREOF

(71) Applicant: SAMSUNG ELECTRO-MECHANICS CO., LTD., Suwon, Gyunggi-do (KR)

(72) Inventor: Sung Heum Park, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 324 days.

(21) Appl. No.: 14/163,703

(22) Filed: Jan. 24, 2014

(65) Prior Publication Data
US 2015/0115878 A1   Apr. 30, 2015

(30) Foreign Application Priority Data
Oct. 31, 2013   (KR) .................. 10-2013-0131343

(51) Int. Cl.
*H02J 7/00* (2006.01)
*H02J 7/02* (2016.01)
*H02J 17/00* (2006.01)

(52) U.S. Cl.
CPC ............... *H02J 7/025* (2013.01); *H02J 17/00* (2013.01)

(58) Field of Classification Search
USPC ................................................ 320/106–112
See application file for complete search history.

(56) References Cited

U.S. PATENT DOCUMENTS

| 2012/0038317 A1* | 2/2012 | Miyamoto | H02J 7/025 320/108 |
| 2012/0091950 A1* | 4/2012 | Campanella | H02J 5/005 320/108 |
| 2013/0076306 A1 | 3/2013 | Lee et al. | |
| 2013/0207599 A1* | 8/2013 | Ziv | H02J 7/025 320/108 |

FOREIGN PATENT DOCUMENTS

KR   1020130033867 A   4/2013

* cited by examiner

*Primary Examiner* — Binh Tat
(74) *Attorney, Agent, or Firm* — NSIP Law

(57) ABSTRACT

There are provided a wireless charging device and a control method thereof, the wireless charging device including: a receiving module receiving power from the outside in a magnetic induction scheme or a magnetic resonance scheme to thereby charge a battery; and an input signal determining unit receiving an input signal from the outside and determining characteristics of the input signal, wherein the receiving module includes a reception controlling unit controlling the receiving module to be operated in the magnetic induction scheme or the magnetic resonance scheme according to the characteristics of the input signal received from the input signal determining unit.

7 Claims, 9 Drawing Sheets

WIRELESS CHARGING DEVICE AND CONTROL METHOD THEREOF

CROSS-REFERENCE TO RELATED APPLICATIONS

This application claims the benefit of Korean Patent Application No. 10-2013-0131343 filed on Oct. 31, 2013, with the Korean Intellectual Property Office, the disclosure of which is incorporated herein by reference.

BACKGROUND

The present disclosure relates to a wireless charging device and a control method thereof.

Recently, cellular phones and personal portable electronic products with many additional functions have been released onto the market while maintaining an ultra-slim form. In order for the personal portable electronic product to be actuated, a power source such as a battery is necessary therein. Therefore, in the case of personal portable electronic products, battery use times, charging matters, and the like must be necessarily considered as important factors.

Meanwhile, in order to provide a user with a degree of freedom with respect to battery charging, the introduction of wireless charging technology has recently been promoted by cellular phone manufacturers. In this case, representative examples of wireless charging schemes include a microwave receiving-type scheme using microwaves, a magnetic induction scheme using a magnetic field and a magnetic resonance scheme utilizing energy switching between a magnetic field and an electrical field, and the like.

Here, in the microwave receiving-type scheme, power may be transmitted for a relatively long distance through microwaves being radiated in the atmosphere using an antenna, but significant radiation loss may occur, to thereby limit the efficiency of power transmission.

Meanwhile, in the case of the magnetic induction scheme and the magnetic resonance scheme, the respective technological standard associations therefor have been established. In the case of the magnetic induction scheme, a resonance frequency of 110 KHz to 282 KHz is used, and in the case of the magnetic resonance scheme, a resonance frequency of 6.78 MHz and 13.56 MHz is used. That is, due to the different resonance frequencies of the respective schemes and a communications protocol difference therebetween, the wireless charging schemes are incompatible with each other.

The following Patent Document 1, the related art document, relates to a wireless power transmission system selectively using a magnetic induction scheme or a magnetic resonance scheme depending on distance. That is, Patent Document 1 does not disclose a wireless charging device which may be operated in both respective technological standards through an analysis of an input signal provided from a transmitter.

RELATED ART DOCUMENT (Patent Document 1) Korean Patent Laid-Open Publication No. 10-2013-0033867

SUMMARY

An aspect of the present disclosure may provide a wireless charging device capable of being operated using respective technological standards of a magnetic resonance scheme and a magnetic induction scheme by analyzing an input signal received from a transmitter, and a control method thereof.

According to an aspect of the present disclosure, a wireless charging device may include: a receiving module receiving power from the outside in a magnetic induction scheme or a magnetic resonance scheme to thereby charge a battery; and an input signal determining unit receiving an input signal from the outside and determining characteristics of the input signal, wherein the receiving module includes a reception controlling unit controlling the receiving module to be operated in the magnetic induction scheme or the magnetic resonance scheme according to the characteristics of the input signal received from the input signal determining unit.

The receiving module may further include: a rectifier rectifying the received power; and a converting unit converting the power received from the rectifier into an output voltage to thereby provide the output voltage to the battery.

The reception controlling unit may control the receiving module to be operated in the magnetic induction scheme in a case in which an operating frequency band of the input signal is 110 KHz to 282 KHz or an interval of the input signal is 15.3 ms or 65 ms, and may control the receiving module to be operated in the magnetic resonance scheme in a case in which the operating frequency band of the input signal is 6.78 MHz or 13.56 MHz, or the interval of the input signal is 250 ms or 800 ms to 3000 ms.

The receiving module may further include a plurality of variable capacitors connected to one another in parallel and having capacitance varied according the input signal.

The receiving module may further include a plurality of switches connected to the plurality of variable capacitors in series.

The reception controlling unit may control a switching operation of the plurality of switches using at least one of an operating frequency band, a pulse width, and an interval of the input signal.

The reception controlling unit may vary the capacitance of the plurality of variable capacitors according to the switching operation of the plurality of switches and perform control such that the magnetic induction scheme or the magnetic resonance scheme is used according to the varied capacitance.

According to another aspect of the present disclosure, a wireless charging device may include: a first receiving module receiving power from the outside in a magnetic induction scheme to thereby charge a battery; a second receiving module receiving power from the outside in a magnetic resonance scheme to thereby charge the battery; a switching unit performing a switching operation such that one of the first and second receiving modules is selected; and a switching controlling unit controlling the switching operation of the switching unit according to an input signal received from the outside.

The magnetic induction scheme may be one of a wireless power consortium (WPC) standard and a power matters alliance (PMA) standard.

The magnetic resonance scheme may be an alliance for wireless power (A4WP) standard.

The first receiving module may include: a first rectifier rectifying the received power; a first converting unit converting the power received from the first rectifier into an output voltage to thereby provide the output voltage to the battery; and a first controlling unit providing a charging completion signal to the switching controlling unit when a charging of the battery has been completed.

The second receiving module may include: a second rectifier rectifying the received power; a second converting unit converting the power received from the second rectifier into an output voltage to thereby provide the output voltage to the battery; and a second controlling unit providing a charging completion signal to the switching controlling unit when a charging of the battery has been completed.

The switching controlling unit may control the switching operation of the switching unit using at least one of an operating frequency band, a pulse width, and an interval of the input signal.

The switching controlling unit may control the switching operation of the switching unit such that the first receiving module is selected in a case in which the operating frequency band of the input signal is 110 KHz to 282 KHz or the interval of the input signal is 15.3 ms or 65 ms, and may control the switching operation of the switching unit such that the second receiving module is selected in a case in which the operating frequency band of the input signal is 6.78 MHz or 13.56 MHz, or the interval of the input signal is 250 ms or 800 ms to 3000 ms.

According to another aspect of the present disclosure, a control method of a wireless charging device may include: receiving an input signal from the outside; selecting a magnetic induction scheme or a magnetic resonance scheme such that a receiving module is used in the magnetic induction scheme or the magnetic resonance scheme according to characteristics of the input signal; and receiving, by the receiving module, power from the outside in the selected scheme from among the magnetic induction scheme and the magnetic resonance scheme to thereby charge a battery.

The control method may further include determining at least one of an operating frequency, a pulse width, and an interval of the input signal.

The selecting of the magnetic induction scheme or the magnetic resonance scheme may include selecting the magnetic induction scheme to be used in a case in which the operating frequency band of the input signal is 110 KHz to 282 KHz or the interval of the input signal is 15.3 ms or 65 ms, and selecting the magnetic resonance scheme to be used in a case in which the operating frequency band of the input signal is 6.78 MHz or 13.56 MHz, or the interval of the input signal is 250 ms or 800 ms to 3000 ms.

The selecting of the magnetic induction scheme or the magnetic resonance scheme may include: controlling a switching operation of a plurality of switches connected to a plurality of variable capacitors in series according to determined characteristics of the input signal; varying capacitance of the plurality of variable capacitors through the switching operation; and selecting the magnetic induction scheme or the magnetic resonance scheme to be used according to the varied capacitance.

The magnetic induction scheme may be one of a wireless power consortium (WPC) standard and a power matters alliance (PMA) standard.

The magnetic resonance scheme may be an alliance for wireless power (A4WP) standard.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
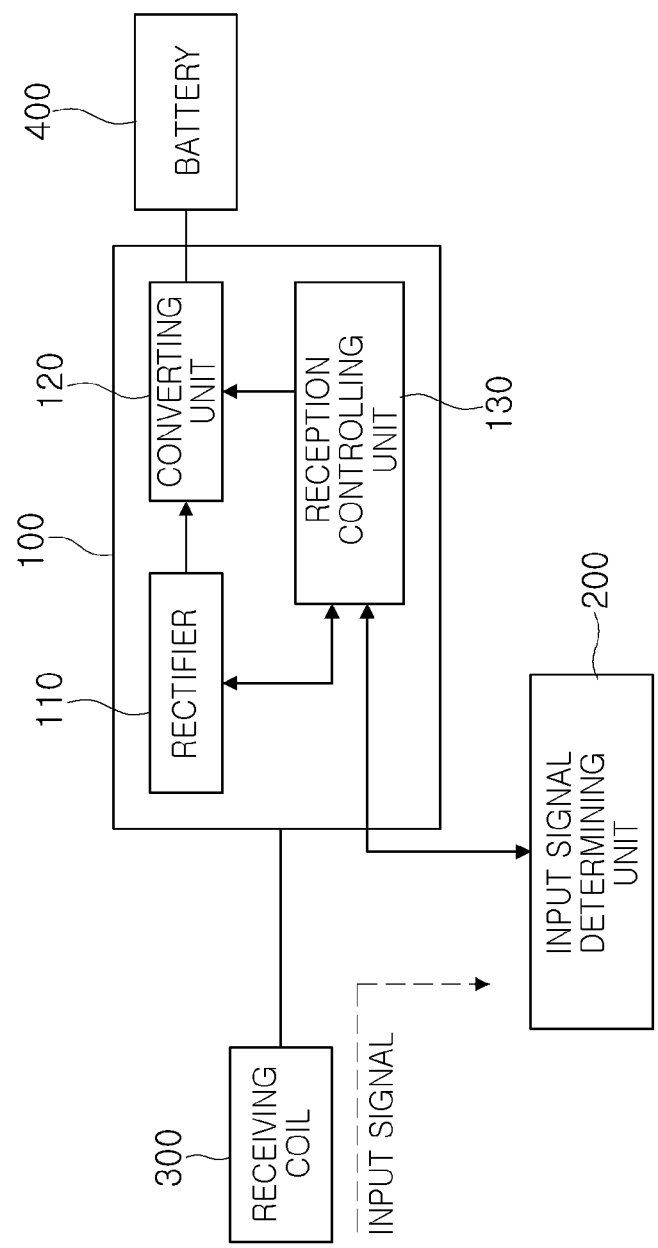
FIG. 1 is a block diagram illustrating a wireless charging device according to an exemplary embodiment of the present disclosure.

Hereinafter, exemplary embodiments of the present disclosure will be described in detail with reference to the accompanying drawings. The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art. Throughout the drawings, the same or like reference numerals will be used to designate the same or like elements.

FIG. 1 is a block diagram illustrating a wireless charging device according to an exemplary embodiment of the present disclosure.

Referring to FIG. 1, the wireless charging device according to an exemplar embodiment of the present disclosure may include a receiving module 100 receiving power from the outside in a magnetic induction scheme or a magnetic resonance scheme to thereby charge a battery 400, and an input signal determining unit 200 receiving an input signal from the outside and determining characteristics of the input signal.

Meanwhile, the receiving module 100 may include a rectifier 110, a converting unit 120, and a reception controlling unit 130.

The rectifier 110 may rectify the power received from the outside and provide the power to the converting unit 120. The converting unit 120 may convert the power received from the rectifier 110 into an output voltage and provide the voltage to the battery 400.

A receiving coil 300 may receive power from the outside. In this case, the power received from the outside may be power received from a transmitter of a wireless charging system, for example. The power received from the transmitter may be high frequency power of about several tens KHz to several tens MHz.

In this case, the battery 400 may be a battery, typically used in a portable wireless terminal, or the like.

Meanwhile, the reception controlling unit 130 may control the receiving module 100 to be operated in the magnetic induction scheme or the magnetic resonance scheme according to characteristics of the input signal received from the input signal determining unit 200.

In this case, the magnetic induction scheme may be one of a wireless power consortium (WPC) standard and a power matters alliance (PMA) standard, and the magnetic resonance scheme may be an alliance for wireless power (A4WP) standard.

In this case, the input signal may be different according to three standards of a wireless charging technology. The following Table 1 represents three types of input signal which are different according to the three standards of the wireless charging technology.

TABLE 1

| Classification | WPC (Magnetic Induction) | PMA (Magnetic Induction) | A4WP (Magnetic Resonance) |
|---|---|---|---|
| Operating Frequency Band | 110-205 KHz | 230-282 KHz | 6.78 MHz or 13.56 MHz |
| Ping Frequency | 175 KHz | 220 KHz-450 KHz | Beacon Signal |
| Ping interval | 65 ms | 15.3 ms | Beacon Signal |

That is, the WPC standard in the magnetic induction scheme has a ping frequency of 175 KHz and a ping interval of 65 ms, and the PMA standard has a ping frequency of 220 to 450 KHz and aping interval of 15.3 ms. In contrast, the A4WP standard, the magnetic resonance scheme, may search for whether or not the receiving module is present using a short beacon signal or a long beacon signal. In this case, the short beacon signal may provide the input signal for 30 ms at an interval of 250 ms, and the long beacon signal may provide the input signal having a pulse width of 105+/−5 ms at an interval of 800 to 3000 ms.

In this case, the input signal determining unit 200 may determine the scheme of the standard of the input signal among the three standards of the wireless charging technology using at least one of an operating frequency band, a pulse width, and an interval of the input signal provided from the outside, by, for example, the transmitter. The input signal determining unit 200 may determine a current standard of the wireless charging scheme according to the input signal and may control the receiving module 100 to be operated according to the determined standard.

More specifically, in the case in which the operating frequency band of the input signal is 110 KHz to 282 KHz, or the interval of the input signal is 15.3 ms or 65 ms, since the current standard of the input signal corresponds to the WPC standard or the PMA standard of the magnetic induction scheme, the input signal determining unit 200 may control the reception controlling unit 130 such that the receiving module 100 may be operated in response to the WPC standard or the PMA standard.

In addition, in the case in which the operating frequency band of the input signal is 6.78 MHz or 13.56 MHz, or the interval of the input signal is 250 ms or 800 ms to 3000 ms, since the current standard of the input signal corresponds to the A4WP standard of the magnetic resonance scheme, the input signal determining unit 200 may control the reception controlling unit 130 such that the receiving module 100 may be operated in response to the A4WP standard.

That is, in the magnetic induction scheme (WPC and PMA) and the magnetic resonance scheme (A4WP) that are incompatible with each other, the input signal determining unit 200 may determine characteristics of the input signal and control the reception controlling unit 130, thereby allowing the receiving module 100 to be operated in all of the wireless charging standards.

More specifically, the reception controlling unit 130 may be operated according to the determined result of the input signal provided from the input signal determining unit 200, and for example, in the case in which the operating frequency band of the input signal is 110 KHz to 282 KHz, or the interval of the input signal is 15.3 ms or 65 ms, may control the receiving module 100 to be operated in the magnetic induction scheme. In addition, in the case in which the operating frequency band of the input signal is 6.78 MHz or 13.56 MH, or the interval of the input signal is 250 ms or 800 ms to 3000 ms, the reception controlling unit 130 may control the receiving module 100 to be operated in the magnetic resonance scheme.

That is, the reception controlling unit 130 may perform the control such that the receiving module 100 is operated in the magnetic induction scheme or the magnetic resonance scheme.

Figure 2:
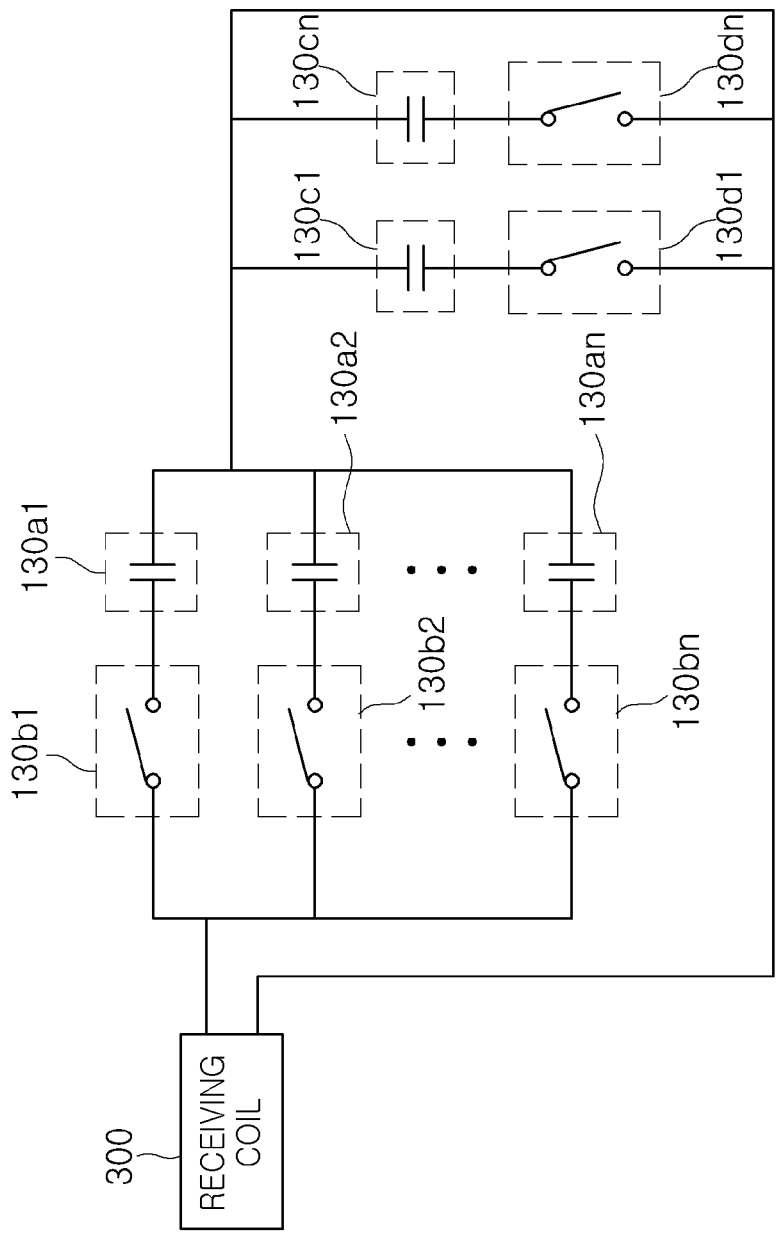
FIG. 2 is a block diagram illustrating a plurality of variable capacitors included in a receiving module of the wireless charging device shown in FIG. 1.

FIG. 2 is a block diagram illustrating a plurality of variable capacitors included in the receiving module 100 of the wireless charging device shown in FIG. 1. Referring to FIG. 2, the receiving module 100 may include a plurality of variable capacitors 130$a$1 to 130$an$ connected to one another in parallel and having capacitance varied according to the input signal provided from the outside. In addition, the receiving module 100 may include a plurality of variable capacitors 130$c$1 to 130$cn$ connected to one another in parallel.

In this case, the plurality of variable capacitors 130$a$1 to 130$an$ may be connected to a plurality of switches 130$b$1 to 130$bn$ in series, and the plurality of variable capacitors 130$c$1 to 130$cn$ may be connected to a plurality of switches 130$d$1 to 130$dn$ in series.

An operation of the reception controlling unit 130 according to the configuration of the plurality of variable capacitors 130$a$1 to 130$an$ and 130$c$1 to 130$cn$ mentioned above will be described. The reception controlling unit 130 may determine the characteristics of the input signal provided from the outside, and may control the receiving module 100 to be operated in the magnetic induction scheme or the magnetic resonance scheme according to varied capacitance of the plurality of variable capacitors 130$a$1 to 130$an$ and 130$c$1 to 130$cn$ by varying capacitance of the plurality of variable capacitors 130$a$1 to 130$an$ and 130$c$1 to 130$cn$ according to the determined characteristics of the input signal.

That is, the reception controlling unit 130 may output a control signal for selectively connecting the plurality of switches 130$b$1 to 130$bn$ and 130$d$1 to 130$dn$ to the plurality of variable capacitors 130$a$1 to 130$an$ and 130$c$1 to 130$cn$ in order to vary the capacitance of the plurality of variable capacitors 130$a$1 to 130$an$ and 130$c$1 to 130$cn$ according to the determined characteristics of the input signal.

Thereby, the input signal determining unit 200 may determine the characteristics of the input signal provided from the outside and the reception controlling unit 130 may control the receiving module 100 to be operated in the magnetic induction scheme or the magnetic resonance scheme according to the determined characteristics of the input signal.

Figure 3:
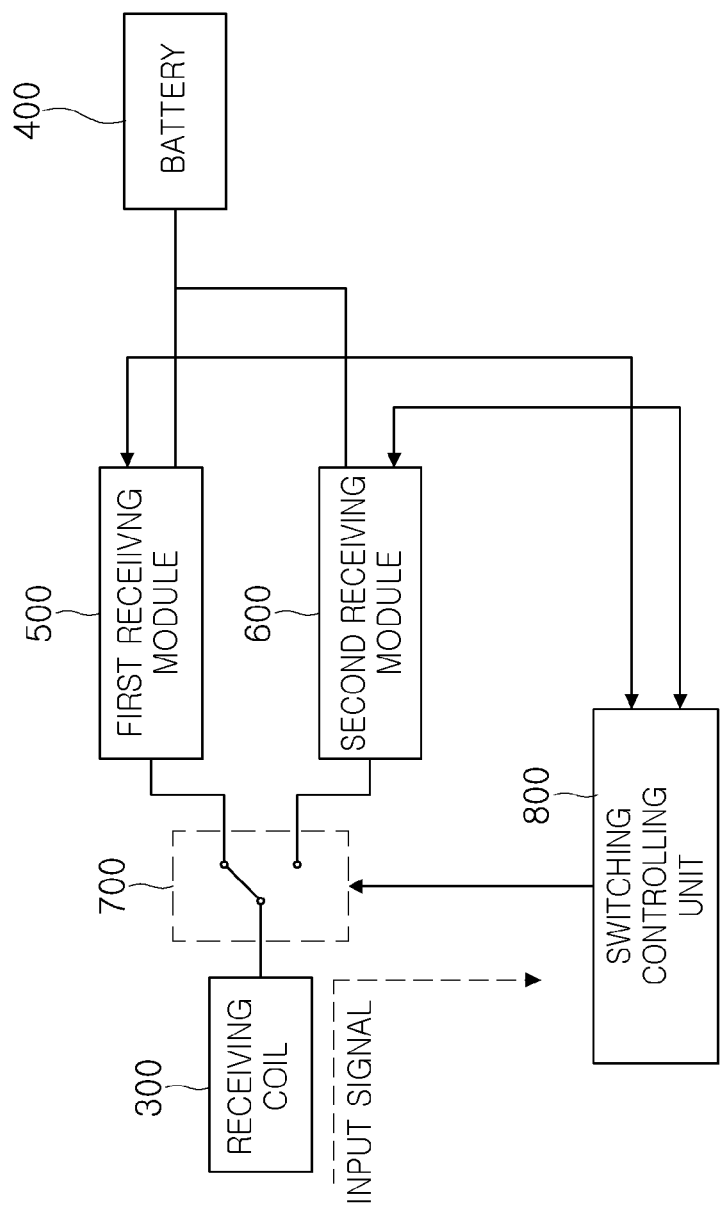
FIG. 3 is a block diagram illustrating a wireless charging device according to another exemplary embodiment of the present disclosure.

FIG. 3 is a block diagram illustrating a wireless charging device according to another exemplary embodiment of the present disclosure.

Figure 4:
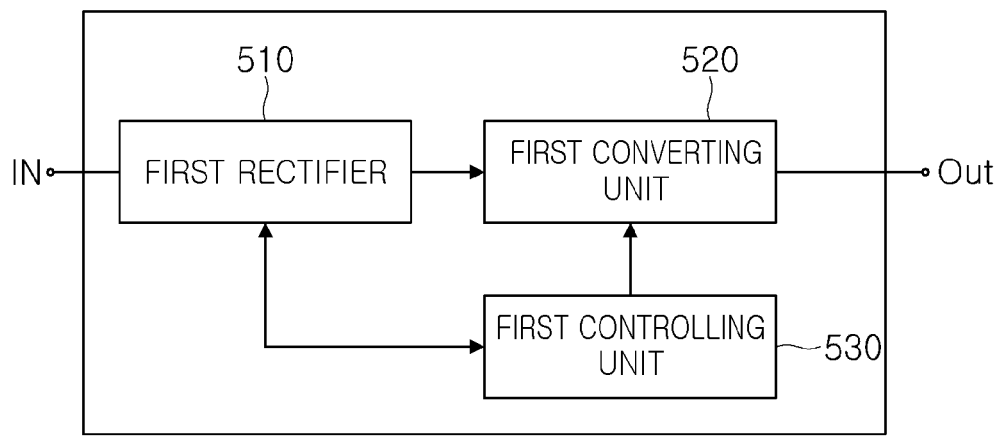
FIG. 4 is a block diagram illustrating a first receiving module of the wireless charging device shown in FIG. 3 in more detail.

FIG. 4 is a block diagram illustrating a first receiving module of the wireless charging device shown in FIG. 3 in more detail.

Figure 5:
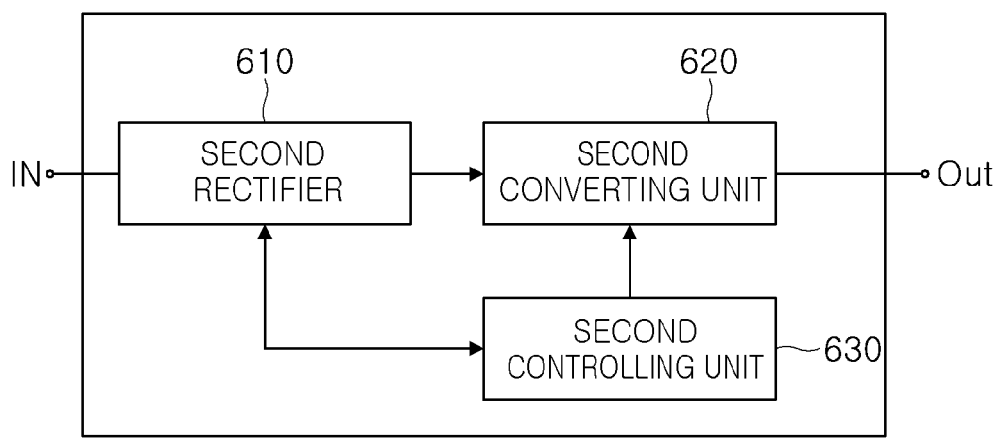
FIG. 5 is a block diagram illustrating a second receiving module of the wireless charging device shown in FIG. 3 in more detail.

FIG. 5 is a block diagram illustrating a second receiving module of the wireless charging device shown in FIG. 3 in more detail.

The wireless charging device according to an exemplary embodiment of the present disclosure may include a first receiving module 500, a second receiving module 600, a switching unit 700, a switching controlling unit 800, the receiving coil 300, and the battery 400.

The first receiving module 500 may receive power received from the outside in a magnetic induction scheme to thereby charge the battery 400.

The second receiving module 600 may receive power received from the outside in a magnetic resonance scheme to thereby charge the battery 400.

Meanwhile, the switching unit 700 may perform the switching operation such that one of the first receiving module 500 and the second receiving module 600 may be selected. In addition, the switching controlling unit 800 may control the switching operation of the switching unit 700 according to the input signal received from the outside.

In this case, the input signal may be provided from an external transmitting module and may allow the transmitting module to determine whether or not the receiving module is present before it provides the receiving module with power. That is, the switching controlling unit 800 may determine the characteristics of the input signal to thereby control the switching operation of the switching unit 700. This will be described below in detail with reference to FIG. 6.

Referring to FIG. 4, the first receiving module 500 may include a first rectifier 510 rectifying the power received from the outside, a first converting unit 520 converting the power received from the first rectifier 510 into an output voltage to provide the output voltage to the battery, and a first controlling unit 530 providing a charging completion signal to the switching controlling unit 800 when the charging of the battery 400 has been completed.

In addition, referring to FIG. 5, the second receiving module 600 may include a second rectifier 610 rectifying the power received from the outside, a second converting unit 620 converting the power received from the second rectifier 600 into an output voltage to provide the output voltage to the battery, and a second controlling unit 630 providing a charging completion signal to the switching controlling unit 800 when the charging of the battery 400 has been completed.

Figure 6:
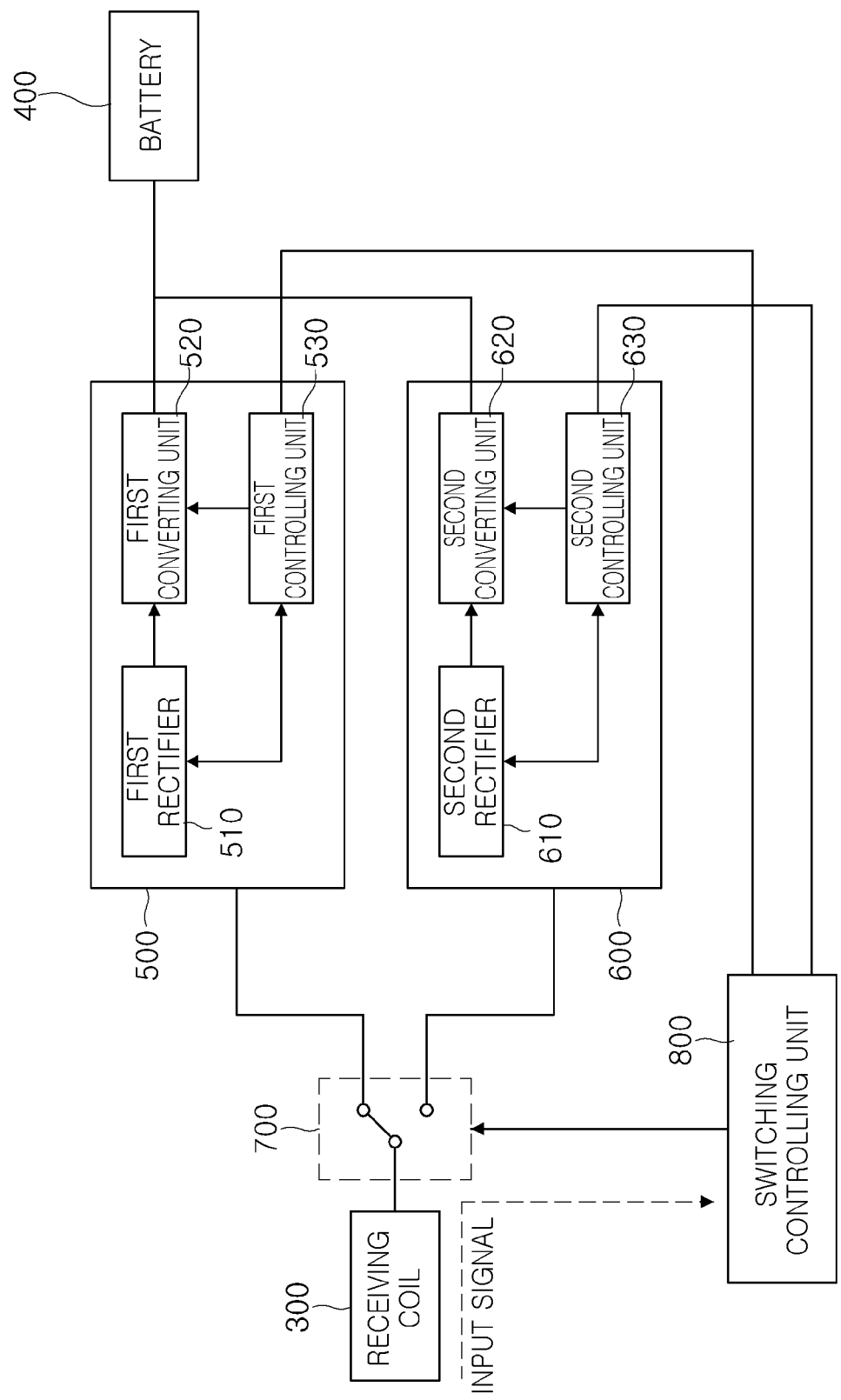
FIG. 6 is a block diagram illustrating the wireless charging device shown in FIG. 3 in more detail.

FIG. 6 is a block diagram illustrating the wireless charging device shown in FIG. 3 in more detail.

The input signal received from the outside may be provided to the switching controlling unit 800 through the receiving coil 300. In this case, the input signal may be different according to three standards of a wireless charging technology, and the switching controlling unit 800 may determine the scheme of the standard of the input signal among the three standards of the wireless charging technology using at least one of an operating frequency band, a pulse width, and an interval of the input signal provided from a transmitter.

More specifically, in the case in which the operating frequency band of the input signal is 110 KHz to 282 KHz, or the interval of the input signal is 15.3 ms or 65 ms, since the current standard of the input signal corresponds to the WPC standard or the PMA standard of the magnetic induction scheme, the switching controlling unit 800 may control the switching operation of the switching unit 700 such that the first receiving module 500 is selected.

In addition, in the case in which the operating frequency band of the input signal is 6.78 MHz or 13.56 MHz, or the interval of the input signal is 250 ms or 800 ms to 3000 ms, since the current standard of the input signal corresponds to the A4WP standard of the magnetic resonance scheme, the switching controlling unit 800 may control the switching operation of the switching unit 700 such that the second receiving module 600 is selected.

That is, in the magnetic induction scheme (WPC and PMA) and the magnetic resonance scheme (A4WP) incompatible with each other, the switching controlling unit 800 may determine characteristics of the input signal and control the switching operation of the switching unit 700, thereby allowing the receiving modules to be operated in all of the wireless charging standards.

Figure 7:
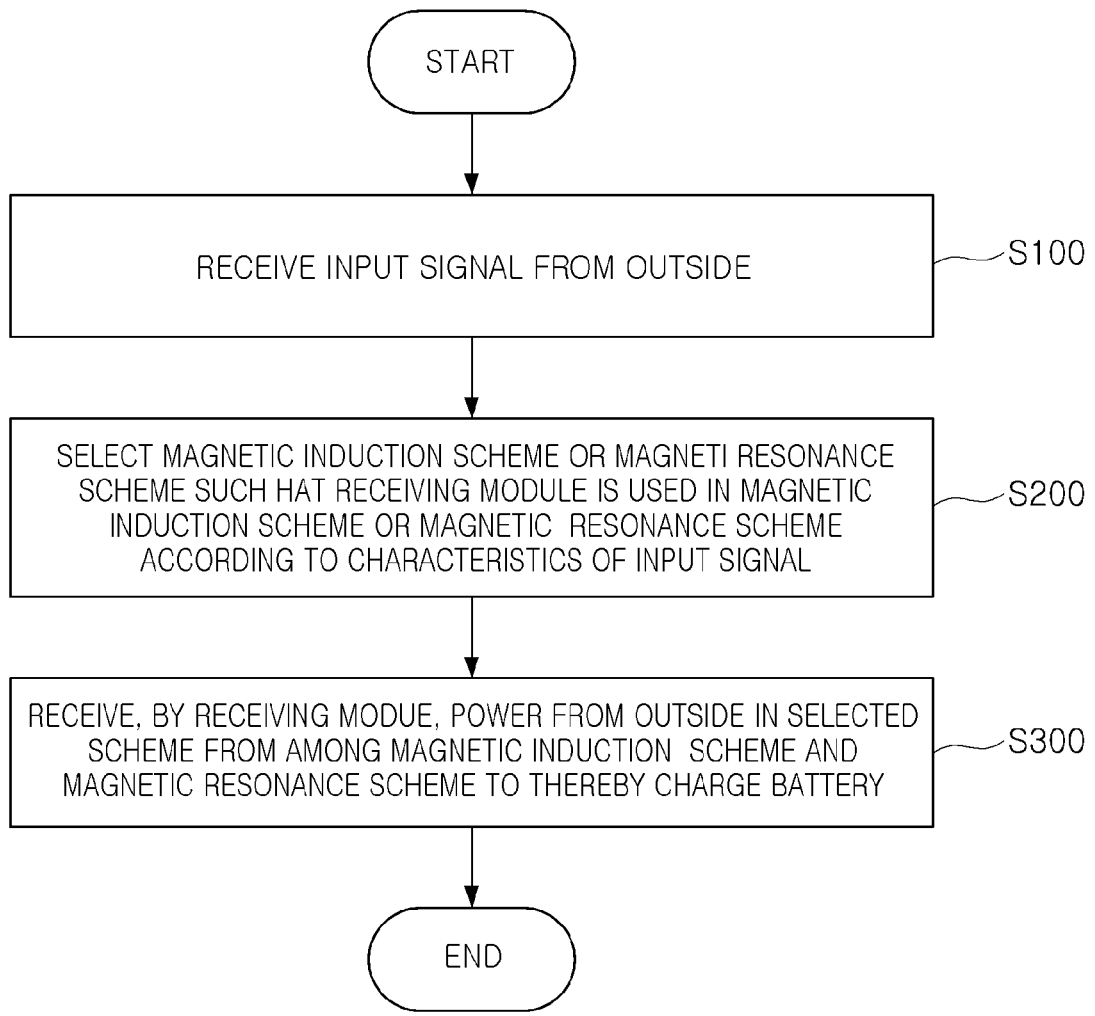
FIG. 7 is a flow chart illustrating a control method of the wireless charging device according to an exemplary embodiment of the present disclosure.

FIG. 7 is a flow chart illustrating a control method of the wireless charging device according to an exemplary embodiment of the present disclosure.

Figure 8:
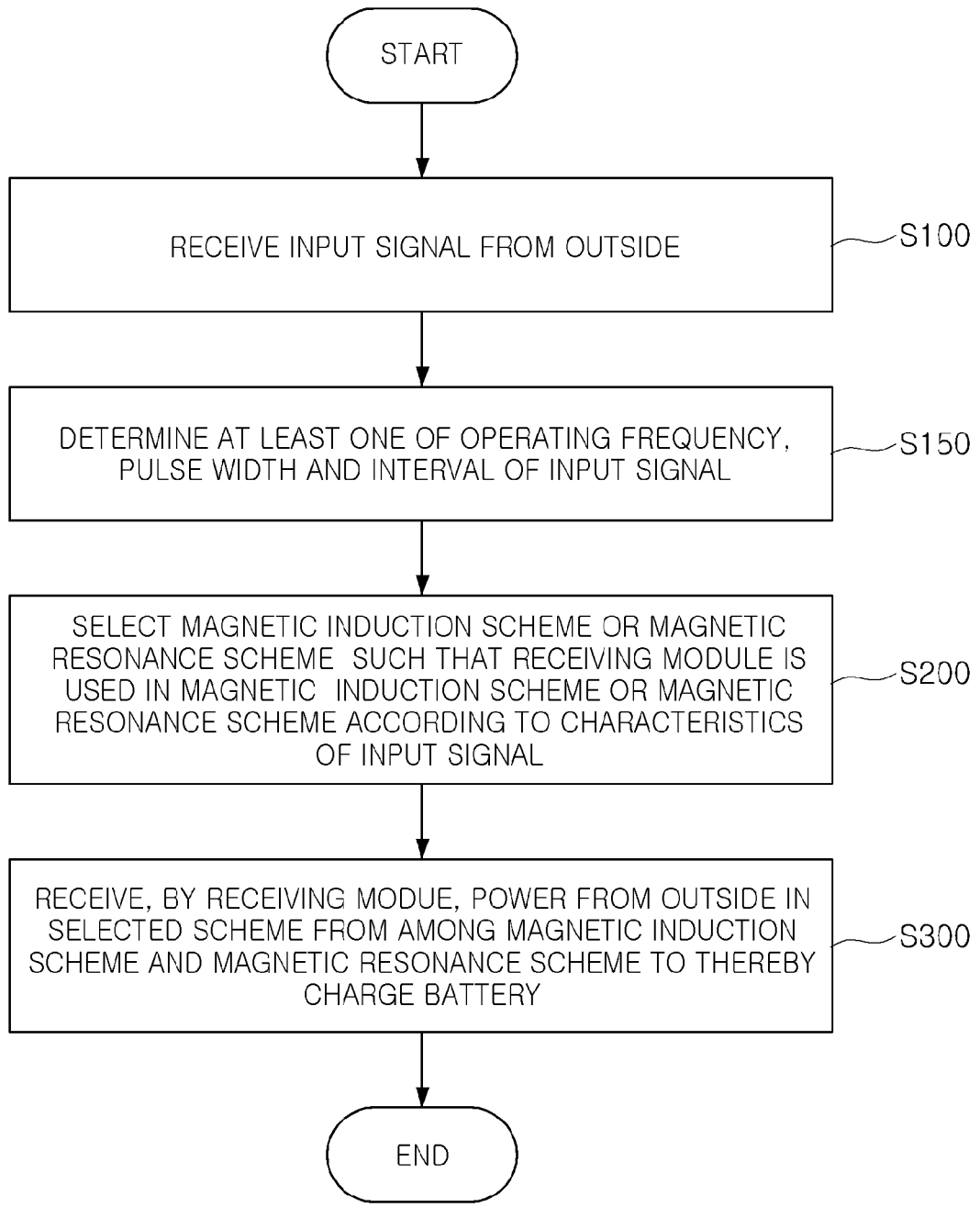
FIG. 8 is a flow chart illustrating the control method of the wireless charging device shown in FIG. 7 in more detail.

FIG. 8 is a flow chart illustrating the control method of the wireless charging device shown in FIG. 7 in more detail.

Referring to FIGS. 5 and 7, the control method of the wireless charging device according to an exemplary embodiment of the present disclosure may include receiving an input signal from the outside (S100), selecting a magnetic induction scheme or a magnetic resonance scheme such that the receiving module 100 is used in the magnetic induction scheme or the magnetic resonance scheme according to the characteristics of the input signal (S200), and receiving, by the receiving module 100, power from the outside in the selected scheme from among the magnetic induction scheme and the magnetic resonance scheme to thereby charge the battery 400 (S300).

In addition, referring to FIGS. 1 and 8, the control method of the wireless charging device according to an exemplary embodiment of the present disclosure may further include determining at least one of an operating frequency, a pulse width, and an interval of the input signal (S150).

Figure 9:
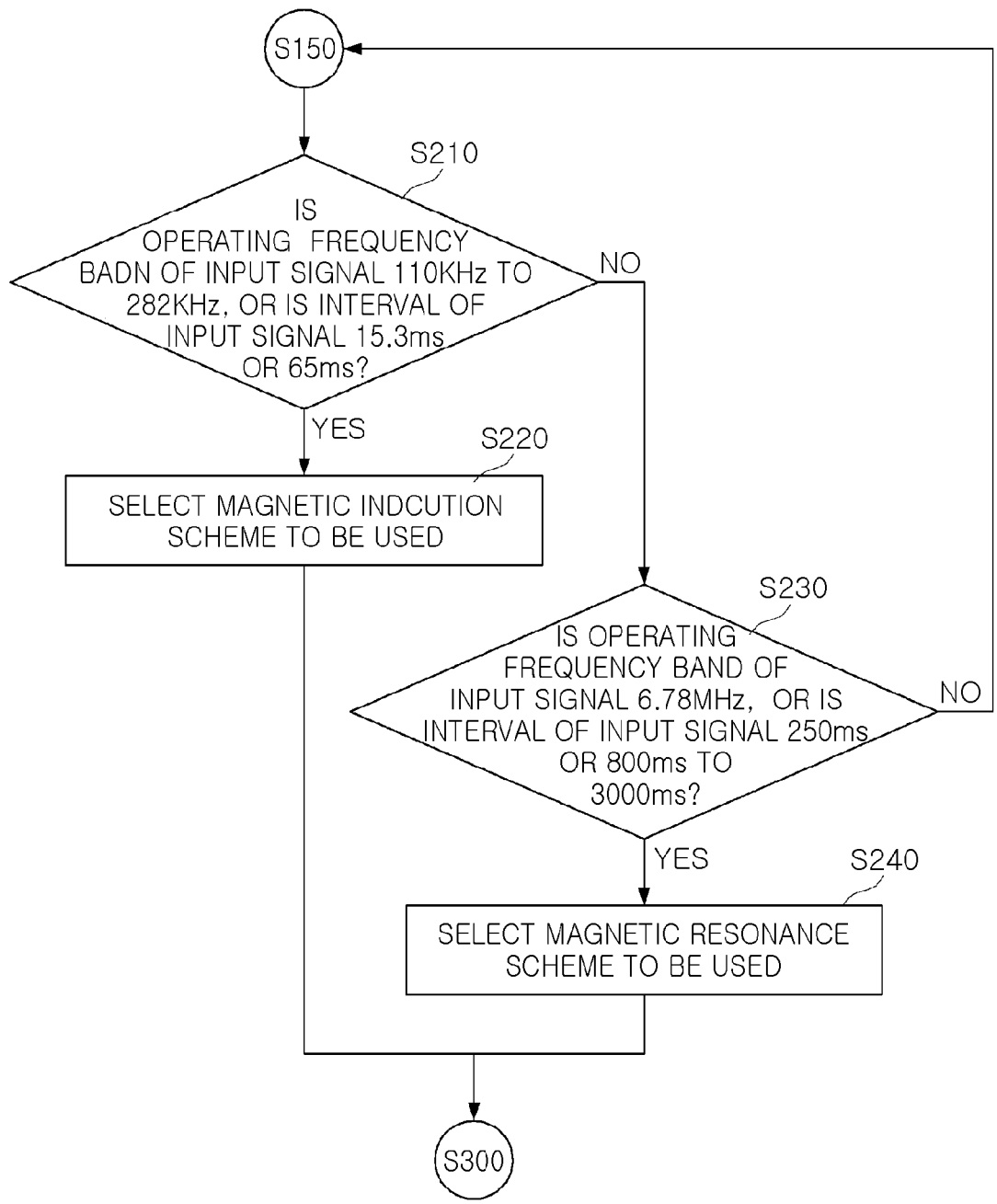
FIG. 9 is a flowchart illustrating a method of selecting a wireless charging scheme in the control method of the wireless charging device shown in FIG. 7.

FIG. 9 is a flow chart illustrating a method of selecting a wireless charging scheme in the control method of the wireless charging device shown in FIG. 7.

Figure 10:
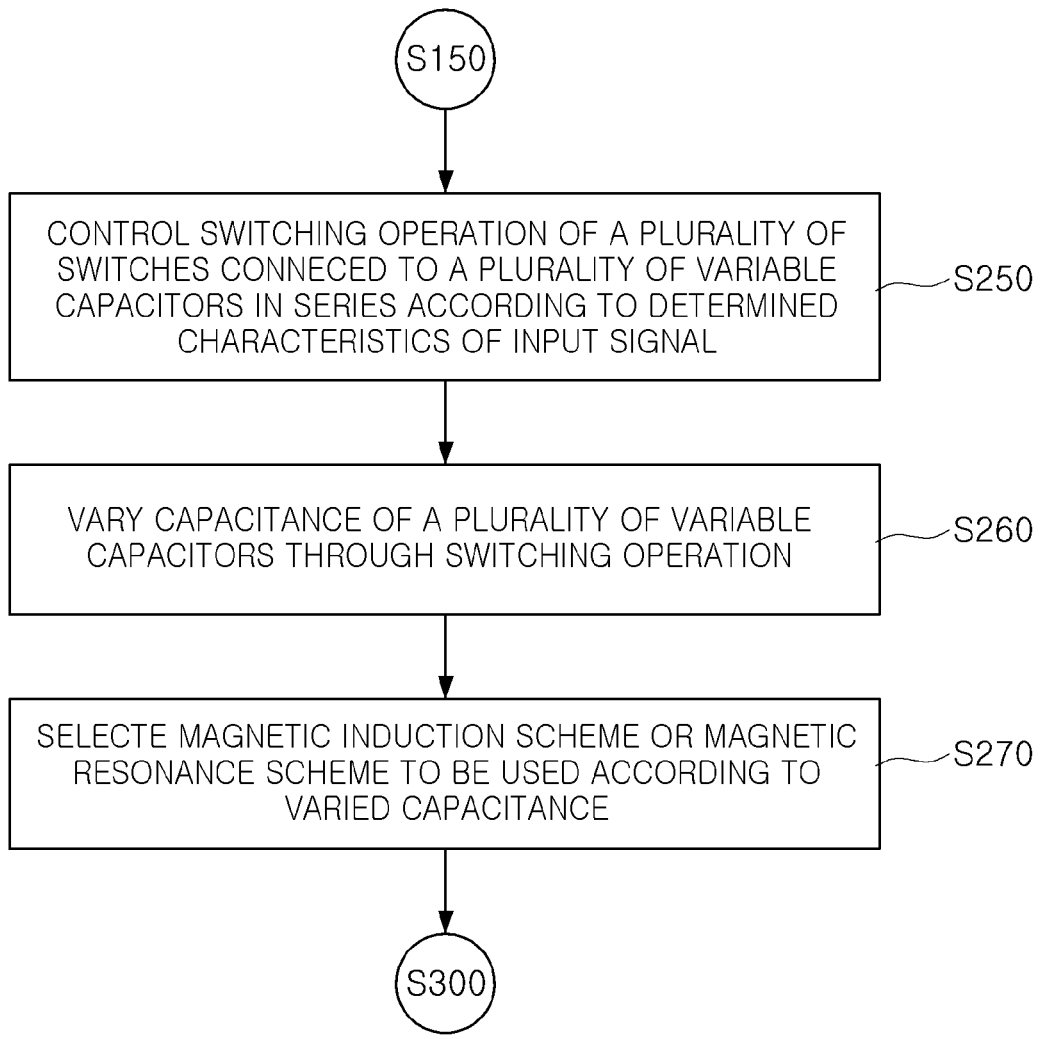
FIG. 10 is a flow chart illustrating an operation of selecting the wireless charging scheme in the control method of the wireless charging device shown in FIG. 7 in more detail.

FIG. 10 is a flow chart illustrating an operation of selecting the wireless charging scheme in the control method of the wireless charging device shown in FIG. 7 in more detail.

A process of selecting the wireless charging scheme will be described with reference to FIGS. 1 and 9. The control method of the wireless charging device according to an exemplary embodiment of the present disclosure may further include determining, by the reception controlling unit 130, whether or not the operating frequency band of the input signal is 110 KHz to 282 KHz or the interval of the input signal is 15.3 ms or 65 ms (S210), selecting, by the reception controlling unit 130, the magnetic induction scheme to be used in the case in which the operating frequency band of the input signal is 110 KHz to 282 KHz or the interval of the input signal is 15.3 ms or 65 ms (S220), determining, by the reception controlling unit 130, whether or not the operating frequency band of the input signal is 6.78 MHz or 13.56 MHz, or the interval of the input signal is 250 ms or 800 ms to 3000 ms (S230), and selecting, by the reception controlling unit 130, the magnetic resonance scheme to be used in the case in which the operating frequency band of the input signal is 6.78 MHz or 13.56 MHz, or the interval of the input signal is 250 ms or 800 ms to 3000 ms (S240).

In addition, the process of selecting the wireless charging scheme will be described in more detail with reference to FIGS. 1, 2, and 10. The control method of the wireless charging device according to an exemplary embodiment of the present disclosure may further include controlling, by the reception controlling unit 130, a switching operation of the plurality of switches 130b1 to 130bn connected to the plurality of variable capacitors 130a1 to 130an in series according to the determined characteristics of the input signal (S250), varying capacitance of the plurality of variable capacitors 130a1 to 130an through the switching operation (S260), and selecting the magnetic induction scheme or the magnetic resonance scheme to be used according to the varied capacitance (S270).

That is, the reception controlling unit 130 may determine characteristics of the input signal received from the outside, and vary the capacitance of the plurality of variable capacitors 130a1 to 130an according to the determined characteristics of the input signal, thereby controlling the receiving module 100 to be operated in the magnetic induction scheme or the magnetic resonance scheme according the varied capacitance of the plurality of variable capacitors 130a1 to 130an.

As described above, the characteristics of the input signal received from the outside may be determined and the receiving module may be configured to be operated in each standard of the magnetic induction scheme or the magnetic resonance scheme in response to the determined characteristics of the input signal, such that the efficiency of the wireless charging device may be improved.

As set forth above, according to exemplary embodiments of the present disclosure, the wireless charging device capable of being operated in the respective technological standards of the magnetic resonance scheme and the magnetic induction scheme by analyzing the input signal received from the outside (transmitter), and the control method thereof may be provided.

While exemplary embodiments have been shown and described above, it will be apparent to those skilled in the art that modifications and variations could be made without departing from the spirit and scope of the present disclosure as defined by the appended claims.

What is claimed is:

1. A wireless charging device, comprising:
    a receiver configured to receive power from the outside in a magnetic induction scheme or a magnetic resonance scheme to charge a battery; and
    an input signal determiner configured to repeatedly receive an input signal from the outside and determine a time interval between reception times of the input signal,
    wherein
    the receiver comprises a reception controller configured to control the receiver to be operated in the magnetic induction scheme or the magnetic resonance scheme according to the the time interval of the input signal received from the input signal determiner,
    the receiver is configured to operate in the magnetic induction scheme in response to the interval of the input signal being within a first range, and
    the receiver is configured to operate in the magnetic resonance scheme in response to the time interval of the input signal being within a second range.

2. The wireless charging device of claim 1, wherein the receiver further comprises:
    a rectifier configured to rectify the received power; and
    a converter configured to convert the power received from the rectifier into an output voltage and to provide the output voltage to the battery.

3. The wireless charging device of claim 1, wherein the reception controller is configured to control the receiver to be operated in the magnetic induction scheme in response to an operating frequency band of the input signal being in the range of 110 KHz to 282 KHz or the time interval of the input signal being 15.3 ms or 65 ms, and control the receiver to be operated in the magnetic resonance scheme in response to the operating frequency band of the input signal being 6.78 MHz or 13.56 MHz, or the time interval of the input signal being 250 ms or 800 ms to 3000 ms.

4. The wireless charging device of claim 1, wherein the receiver further comprises variable capacitors connected to one another in parallel and having capacitance varied according to the input signal.

5. The wireless charging device of claim 4, wherein the receiver further comprises switches connected to the variable capacitors in series.

6. The wireless charging device of claim 5, wherein the reception controller is configured to control a switching operation of the switches using at least one of an operating frequency band, a pulse width, and the time interval of the input signal.

7. The wireless charging device of claim 5, wherein the reception controller is configured to vary the capacitance of the variable capacitors according to the switching operation of the switches and control the receiver to be operated in the magnetic induction scheme or the magnetic resonance scheme according to the varied capacitance.

* * * * *